United States Patent

Jonsson

Patent Number: 5,839,067
Date of Patent: Nov. 17, 1998

[54] CORPORATE COMMUNICATION SYSTEM

[75] Inventor: Björn Erik Rutger Jonsson, Järfälla, Sweden

[73] Assignee: Telefonaktiebolaget LM Ericsson, Stockholm, Sweden

[21] Appl. No.: 737,409

[22] PCT Filed: Dec. 22, 1995

[86] PCT No.: PCT/SE95/01584

§ 371 Date: Nov. 12, 1996

§ 102(e) Date: Nov. 12, 1996

[87] PCT Pub. No.: WO96/22000

PCT Pub. Date: Jul. 18, 1996

[30] Foreign Application Priority Data

Jan. 10, 1995 [SE] Sweden .................................. 9500066

[51] Int. Cl.⁶ .............................. H04Q 7/26; H04M 3/38
[52] U.S. Cl. .................. 455/422; 455/418; 455/461; 455/445; 455/561; 379/201
[58] Field of Search ....................... 455/422, 418, 455/414, 411, 406, 575, 461, 445, 433, 561; 379/201, 211, 219

[56] References Cited

U.S. PATENT DOCUMENTS

| | | | |
|---|---|---|---|
| 4,481,384 | 11/1984 | Matthews | 455/410 |
| 4,680,786 | 7/1987 | Baker et al. | 455/461 |
| 4,955,049 | 9/1990 | Ghisler | 379/188 |
| 5,502,757 | 3/1996 | Bates et al. | 455/414 |
| 5,537,610 | 7/1996 | Manger et al. | 455/414 |
| 5,557,652 | 9/1996 | Jonsson | 455/411 |
| 5,594,777 | 1/1997 | Makkonen et al. | 455/406 |
| 5,598,458 | 1/1997 | Bales et al. | 455/414 |
| 5,668,862 | 9/1997 | Bannister et al. | 379/201 |
| 5,765,108 | 6/1998 | Martin et al. | 455/422 |

FOREIGN PATENT DOCUMENTS

| | | |
|---|---|---|
| A 3 463 727 | 1/1992 | European Pat. Off. . |
| A 0 514 360 | 11/1992 | European Pat. Off. . |
| A 3 526 981 | 2/1993 | European Pat. Off. . |
| 2 243 746 | 11/1991 | United Kingdom . |
| WO93/16543 | 8/1993 | WIPO . |
| WO93/16546 | 8/1993 | WIPO . |
| WO93/16547 | 8/1993 | WIPO . |
| WO93/16564 | 8/1993 | WIPO . |
| WO95/01064 | 5/1995 | WIPO . |

OTHER PUBLICATIONS

Japanese Abstract, JP 3–280767 (NEC Corp.), vol. 16, No. 104, E–1178, Dec. 11, 1991.
Japanese Abstract, JP 2–250458 (NEC Corp.), vol. 14, No. 576, E–1016, Oct. 8, 1990.

*Primary Examiner*—Willis R. Wolfe
*Assistant Examiner*—Hieu T. Vo
*Attorney, Agent, or Firm*—Burns, Doane, Swecker & Mathis L.L.P.

[57] ABSTRACT

A corporate/organization communications system includes a number of mobile telephones and a local network which has a private automatic branch exchange (PABX) with a number of extensions. Access units are connected to the extensions. A service node, referred to as a mobility server, is connected to the PABX as an adjunct and manages all calls to and from the mobile telephones. The mobile telephones are adapted to make outgoing calls to the PABX only. The mobility server checks the services requested in a call from a mobile telephone. If the requested services match a service profile associated with the mobile telephone, the mobility server initiates the set up of the requested outgoing call. If they do not match the outgoing call is rejected. In this manner, a company or organization can control all outgoing calls from its mobile telephones. Calls directed to the mobile telephones are managed by a call park, call alert and call back sequence.

17 Claims, 10 Drawing Sheets

| MOBILE TELEPHONE |||
|---|---|---|
| Device ID | Type of call | Mobile telephone number |
| DEV-ID-1 | Corporate | X1 X1 X1 |
| DEV-ID-2 | Private | P1 P1 P1 |

Fig.4

| User ID | Directory no | Secret no | Service profile | Alert sent? |
|---|---|---|---|---|
| ID1 | B1B1B1 | X1X1X1 | Service1,Service2,... | Yes |
| ID2 | B2B2B2 | X2X2X2 | Service1,Service3,... | No |
| . | | | | |
| . | | | | |
| . | | | | |
| IDm | BmBmBm | XmXmXm | Service1,Service2,... | No |

CORPORATE COMMUNICATION SYSTEM

TECHNICAL FIELD

This invention relates to a novel communications system comprising a local network including a private automatic branch exchange PABX to which there is connected a number of access units such as cordless telephones or conventional fixed telephone sets. The individual users of the access units are given wide area mobility by providing the users with corporate mobile telephones and by connecting a service node, referred to as a mobility server, to the PABX.

The mobility server is an adjunct to the PABX and manages the additional functions which are required to serve the corporate mobile telephones. Said additional functions may be integrated in the PABX by modifying the existing software programs controlling the PABX. In the following the expression of mobility server may therefore refer either to functionality present in the mobility server or in the PABX.

The mobility server interacts with the PABX in a manner to strictly control calls to and from the users in a uniform way irrespective of the type of terminal, be it a conventional fixed telephone, a cordless telephone or a mobile telephone, used in a call. The operator of the local network allots each user in the local network an individual service profile. The service profile defines the services available to an individual user and may vary from user to user.

The local network operator is often a company, although other operators, such as security organizations, fire-brigades, police corps, property organizations like condominium apartment organizations are conceivable. The organization will thus be able to provide its members with the inventive services.

In the following the invention will be described with reference to its application in a company although it should be understood that the invention equally well is applicable to any other organization served by a local network.

BACKGROUND ART

When a company today provides its employees with mobile telephones the company has to buy a corresponding number of mobile telephone subscriptions of a mobile telephone network operator. The company has no control of the way in which its employees use their corporate mobile telephones. A mobile telephone user may place private local as well as long distance calls using the services provided by the network operator. Not until the company receives the bill from the network operator such unauthorized use of the mobile telephone is revealed. Accordingly, the company has a restrictive policy in giving out mobile telephones to its employees.

A mobile telephone operator, however, has an interest in encouraging the use of as many mobile telephones as possible in the mobile telephone network.

Other employees of the above company have access units, such as office telephones and cordless telephones, which are connected to a private automatic branch exchange PABX. The PABX can be programmed to control the service available at an access unit. As an example inter PABX calls, i.e. calls from one extension to another can be placed without any restrictions. Outgoing PABX-external calls, i.a. calls having a destination other than a PABX-internal extension, are controlled by the PABX and therefore by the company. As an example a company may program its PABX to bar long distance calls, calls to premium rate numbers (a premium rate number is associated with a service which is delivered via a telephone and for which payment is due), calls outside a local area. Many other examples of programmed restrictions are possible. Consider the following situation: When an employee having an office telephone set at her/his office the desk, or having a cordless telephone of restricted area coverage, leaves the company premises, for example in order to carry out a company service, the employee is no longer accessible. Sometimes it might be desirable to access a person of this category. This situation might not occur very often, but nevertheless occasionally it might be of utmost importance to be able to establish contact with such a person when she/he is outside the company site. However, the company might be inclined not to provide personal of this category with mobile telephones because of the low frequency of such "important" calls in view of the problems mentioned above.

When a company today provides some of its employees with mobile telephones problems arise as to control, handling and charging of service features. A service feature is sometimes referred to as a functionality or an add-on service. Typical examples of service features are call forwarding, call forwarding on busy, and call waiting. If for example the service feature call forwarding is requested by the user of a mobile telephone the mobile telephone network operator will deliver, handle and charge for the requested service. The operator of the local network will accordingly loose control over the delivery, handling and charging of the requested service. In addition a particular service feature, such as call forwarding, is most likely designed differently in the two networks, costs differently in the two networks and is accessed differently in the two networks.

As mentioned above there exists an inconsistency in the way the mobile telephone network and the local network handle service features requested in a call. Say for example a voice mail service exists in the local network as well as in the mobile telephone network and that the voice mail service should be invoked in calls which are not answered by the called party. In the local network the caller will be offered to leave a message to the called party if the called party does not answer and this message will be stored in the company's voice mail service facility. In the mobile telephone network a caller will also be offered to leave a message to a called party in case the called party does not answer and this message will now be stored in a voice mail facility operated by the mobile telephone network. If the called party is one and the same person her/his voice mails will be stored in different facilities. The same service will accordingly be handled differently in the two networks.

Moreover, company related messages will be stored in voice mail facilities over which the company has no control. This poses security problems.

The following example illustrates that a company cannot control the costs of a service feature: A company employee has an office telephone at his desk and a mobile telephone. Before the employee goes mobile she/he activates, at the office telephone the service feature "call forwarding" and orders, by dialling a corresponding key sequence at the fixed office telephone, all incoming calls to be directed to her/his mobile telephone. A caller making a call to the said employee and using the directory number of the office telephone will have the called transferred from the company's PABX to a mobile switch center MSC in the mobile telephone network and from there to the base station controller BSC currently serving the employee's mobile telephone. Call forwarding to the mobile telephone network will be charged either the called party or the caller. In either case a call which is forwarded will cost the company an extra charge.

As mobile phone calls are expensive a company would wish to forbid private calls on corporate mobile telephones. Such a prohibition is difficult to supervise if the mobile phone calls are served by the mobile telephone network. An employee provided with a corporate mobile telephone and wanting to make a private call while she/he is mobile would then have to make the private call on a separate private mobile telephone. Accordingly a mobile employee would have to carry two mobile telephones under such circumstances.

Today corporate mobile telephone subscriptions are so designed that each mobile telephone subscription is associated with a specific user. The administration of the corporate mobile telephones is a slow process. In particular the act of associating a particular individual person with a particular service profile has to be done by the network operator. The process of changing subscription details is slow and may take days.

Calls from corporate mobile telephones which are located in an area close to, and including, the company premises and which are directed to extensions of the company PABX present a particular problem. Today such calls are routed via a base station BS, from the base station to a base station controller BSC, from the base station controller to a mobile telephone switch center MSC and from the base station controller to the PABX. Such calls will accordingly make use of many resources of the mobile telephone network.

EP-A3-463 727 relates to a mobile communications network in which the current geographical position of a mobile subscriber is associated with a predetermined type of call. When the mobile user is close to her/his company premises a first service profile is allotted to the mobile subscriber, when the mobile subscriber is at home a second, different, service profile is allotted to the mobile subscriber and when the mobile subscriber is somewhere between said locations a third service profile is allotted to the mobile subscriber. A base station controller BSC stores information on the current geographical position of the mobile subscriber. If the mobile subscriber makes an outgoing call the BSC identifies the destination of the call and assigns a corresponding service profile to the call. The service profile thus given has impact on the tariff rate and billing of the call. Accordingly, the mobile network controls the service profile of the mobile subscriber based upon the current geographical position of the mobile subscriber.

BG-A-2 243 746 relates to a cordless telephone hand-set of the type which can only originate calls and which has an integrated radio pager for providing its user with an indication that a calling party wishes to contact the user. By means of a keypad provided on the cordless telephone hand-set the user is able to program the radio pager's memory. In this way each address which defines the radio pager's identity is programmed into the radio pager.

EP-A3-526 981 relates to a cellular telephone with a plurality of telephone numbers. Each number is mapped onto one and the same cellular telephone device identity. All telephone numbers thus mapped onto the single unit are stored in a memory of the cellular telephone and are registered in a home mobile telephone switching office, MTSO, together with information on the current location of the cellular telephone. The user may for example have an office number and a private number in the same telephone and these numbers may be selectively disabled by the user so that the cellular telephone is only operable for incoming private calls or for incoming business calls or for incoming business and private calls. Moreover, the cellular telephone can be rendered operative only for outgoing private calls, only for outgoing business calls or for outgoing business and private calls. Accordingly the mobile telephone network has to handle all numbers associated with a particular cellular telephone.

DESCRIPTION OF THE INVENTION

An object of the present invention is to provide a corporate or organization communications system wherein users of access units of a local network that is connected to a PABX are given wide area mobility by providing some of said users with corporate or organization mobile telephones and by providing control over services which can be accessed by a corporate or organization mobile telephone. In particular a company or organization shall be able to allot to its corporate or mobile telephones individual service profiles. A service profile allotted to a corporate mobile telephone defines a set of services that a user of said mobile telephone can access.

Another object of the invention is to make it possible for the company or organization to allot to an employee a corporate mobile telephone service profile which is the same as the service profile the company or organization allots that employee's office telephone set and that employee's cordless telephone. An employee shall thus have the same services available irrespective of the type of terminal used for a call, be it a corporate mobile telephone, an office telephone set or a cordless telephone.

Another object of the invention is to provide a corporate or organization communications system wherein the company or organization controls services, provided by the company to its employees and also provided by the company or organization towards calling customers, in a uniform manner irrespective of the type of terminal, be it a fixed office telephone, a corporate cordless telephone or a corporate mobile telephone, the calling or called employee is using when she/he makes a call or takes a call.

Another object of the invention is to provide a corporate or organization communications system wherein the company or organization handles all services towards calling customers, such as voice mail service, within the corporate or organization communications network.

Another object of the invention is to provide a corporate or organization communications system wherein calls directed to an employee of the company or organization are processed in a uniform way, as seen in the perspective from a calling party, irrespective of the type of terminal, be it an office telephone, a cordless telephone or a mobile telephone, at which the call is picked up.

Still another object of the invention is to provide a corporate or organization communications system wherein an incoming call to the company or organization is subject to lowest possible cost irrespective of the type of terminal, be it an office telephone, a cordless telephone or a corporate mobile telephone, at which the call is picked up.

Still another object of the invention is to provide a corporate or organization communications system wherein a call to a corporate or organization mobile telephone can be made subject to conditions defined by the company. In particular the called mobile user has to approve she/he is willing to take the call before the call is forwarded from the PABX to the mobile telephone associated with said user.

Still another object of the invention is to provide a corporate or organization communications system wherein a user of a corporate or organization mobile telephone shall be able to make personal calls using the corporate or organization mobile telephone.

Still another object of the invention is to move the administration of subscription related matters from the operator of the mobile telephone network to the company or organization.

An object of the invention is to reduce the use of resources of the mobile telephone network in a mobile telephone call from a corporate mobile telephone to an extension in the company PABX, thus making it possible to apply discount tariffs for corporate usage.

In accordance with the invention the above objects are achieved by connecting a service node to said PABX and by adapting ordinary mobile telephones of general type such that they can make only outgoing call to said service node. The service node is adapted to mediate all calls to and from the corporate or organization mobile telephones and to control the services requested in outgoing calls from any of said corporate or organization mobile telephones.

In the following the service node will be referred to as mobility server because it offers mobility to the users at the extensions of the PABX.

In accordance with still another aspect of the invention, this aspect depending on the fact that a corporate or organization mobile telephone can only make outgoing calls to the mobility server, charging of outgoing calls from corporate or organization mobile telephones is not related to individual corporate or organization mobile telephone subscriptions but to the catalog number said mobile telephones are using when making said outgoing calls. In particular said catalog number is that of the PABX and is common to all of said mobile telephones. In this way the company can have a pool of corporate mobile telephones all of which are associated with one and the same subscription with the mobile telephone network operator. The company or organization negotiates with the mobile telephone network operator on the tariff to be used for the mobile telephone calls which are using said PABX catalog number as destination. In this manner the network operator is relieved of the burden of administering subscriptions to individual mobile telephone apparatuses and this job is instead taken over by the company or organization.

In accordance with another aspect of the invention the above objective regarding the possibility of making private calls from a corporate or organization mobile telephone is achieved by associating each corporate or organization mobile telephone with two device identities, one being corporate or organization and the other being private. Each device identity is associated with a respective mobile telephone number. The corporate or organization device identity is associated with catalogue number of the company or organization and the private device identity is associated with he individual user's private mobile telephone catalog number. The private device identity is associated with a private subscription. For an outgoing call the user selects the device identity, the corporate or the private, to be used for the call.

In order to be able to pick up incoming calls, which either are private or business, the corporate mobile telephone may register its two device identities in the mobile telephone network. Accordingly one and the same mobile telephone apparatus may be reached using either the corporate or the private catalogue number.

When the user of a corporate or organization mobile telephone makes an outgoing call and selects the corporate or organization device identity the telephone services available to the user are restricted to those allowed by the company requested.

In a preferred embodiment of the invention the services available to the corporate mobile telephones under this circumstance (corporate call) are the same as those available to the fixed office telephone sets or cordless telephones connected to the PABX to which the service node is connected. When the user of a corporate or organization mobile telephone makes an outgoing call and selects the private device identity the telephone services available to the user are those which the user have subscribed to in his private subscription.

By relating the device identity of a corporate mobile telephone to an individual person and by relating the charging of corporate mobile telephones to a telephone number, which is common to all corporate mobile telephones, the company or organization may own a pool of mobile telephones. From this pool an individual mobile telephone is given to an employee, when there is a need to provide said employee with a mobile telephone, and the company associates the device identity of the mobile telephone given to said employee with parameters which are individual to said employee, such parameters including the name of the employee, the extension number of the office telephone of said employee. Such parameters are entered into the corporate communications system by an authorized company person, such as for example a PABX operator, taking care of the hand out of corporate mobile telephones. Accordingly the administration of the corporate mobile telephones can be done swiftly in connection with the hand out.

Use of resources of the mobile telephone network for calls of the above described type may be reduced by providing direct line from local base stations, which pick up such calls, to the company PABX. Companies having geographically distributed premises, each of which is provided with an individual PABX, such as for example a company having factories in different towns, may provide direct lines between its respective PABX and the local base stations picking up said calls. Further, by interconnecting all such PABX:s with direct lines, leased by the company, the mobile telephone network will to a great extent be relieved of internal company traffic.

As an alternative to or as a complement to direct lines between a company PABX and local base stations direct lines may be provided between a company PABX and a mobile switch center MSC. A GSM mobile telephone network comprises base station controllers BSC. In accordance with the invention direct lines may be provided between a company PABX and base station controllers.

Instead of using a local network comprising a PABX the invention can be realized by using a network comprising a CENTREX. CENTREX is the name of a set of communication services designed to provide low-cost telephone service for medium- to large-scale business customers. The services originates in the telephone company's central office rather than in an on-site system, such as a PBX. By using a CENTREX the company/organisation need not own a PABX, nor a mobility server but these units are residing in the central office. It is also within the realm of the present invention to use, instead of a PABX, any other form of local network.

DESCRIPTION OF THE DRAWINGS

The invention and its advantages will be described in detail below with reference to a company and with reference the following drawings wherein.

PREFERRED EMBODIMENTS OF THE INVENTION

Figure 1:
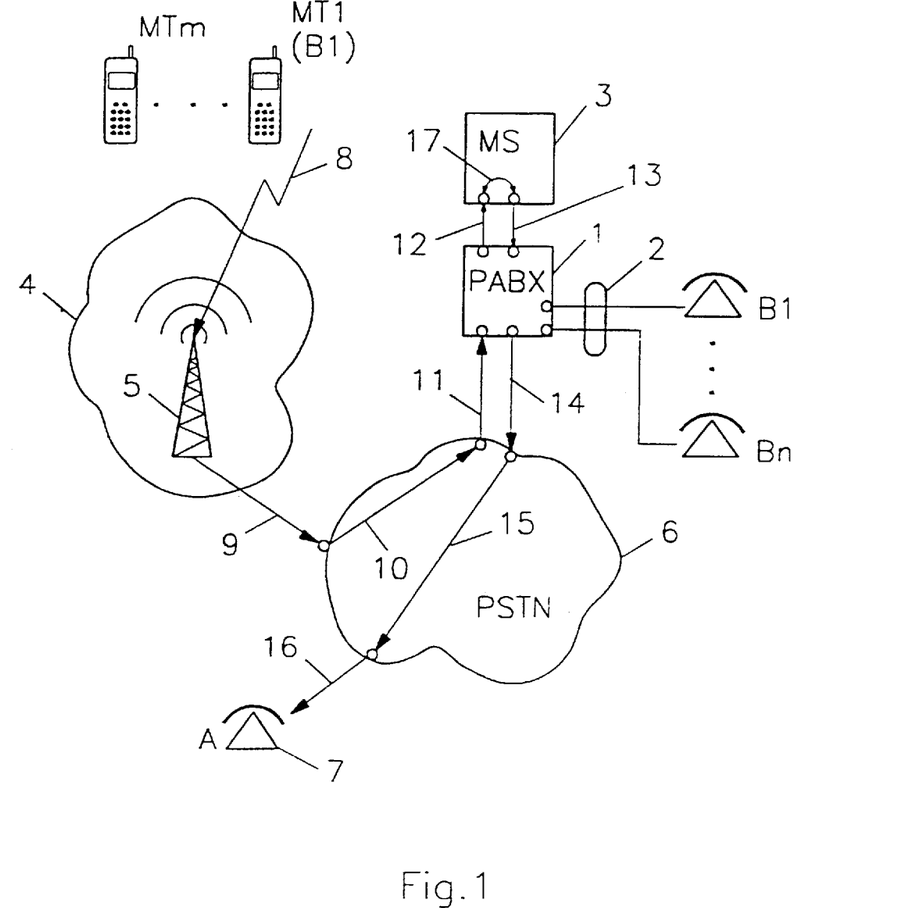
FIG. 1 illustrates the basic concept of a mobility server arrangement in a corporate communication system in accordance with a first embodiment of the present invention.

In FIG. 1 there is shown a PABX 1 provided with a number of extensions 2. To each extension there is connected an office telephone set. The office telephone sets are numbered B1, B2 . . . Bn. Accordingly there are n extensions 2. Now, it is desired that some of the users of the office telephone sets should be provided with corporate mobile telephones in order to increase the availability of such users. It is assumed that the company decides to provide m persons with a corporate mobile telephone. The corporate mobile telephones are labeled MT1, MT2 . . . MTm. A mobility server 3 is connected to the PABX as an adjunct and manages the additional functions required to serve the corporate mobile telephones. As mentioned above said additional services may be integrated in the program software of the PABX. The mobility server interacts with the mobile telephones and with the PABX. The mobile telephones MT1 . . . Mtm are general mobile telephones but are modified in the following two respects: they are programmed so that outgoing calls to can be made only to the mobility server 3, and each mobile telephone has two device identities and the corresponding capability for signalling the two device identities to a mobile telephone network. The mobility server 3 will be described further below. For the moment it is sufficient to indicate that the mobility server is provided with a functionality of generally the same character as that found in for example existing systems for "bank over your phone". Such a system generally comprises a computer provided with different facilities such as voice prompting devices, tone receivers, tone transmitters, modems, answering machines, telefacsimile facilities and similar facilities. The mobility server is capable of serving a sufficient number of concurrent calls. In accordance with the invention all calls to and from the mobile telephones MT1 . . . Mtm are mediated by the mobility server. It will therefore be possible to control the services used by each of the mobile telephones and to provide the users with the same services as available when the users use office telephones and cordless telephones.

A cellular mobile telephone network is indicated at 4 and comprises a number of base stations, one of which is schematically shown at 5. At base station 5 the radio signals from the MT1 is picked up and converted into electrical signals. In a GSM mobile telephone network groups of base stations are connected to a base station controller. Groups of base station controllers are connected to a mobile switch center MSC. In certain mobile telephone systems there are no base station controllers, but a group of base stations are connected directly to a MSC. In either case an MSC is connected to a public switched telephone network, PSTN 6. The subscriber A has an office telephone set 7 connected to the PSTN.

As explained above each mobile telephone is associated with two device identities, one being corporate or organization and the other being private. The corporate device identity may, but need not, be associated with a corporate mobile telephone number. The private device identity is associated with the individual user's private mobile telephone catalog number. The mobile telephone network keeps track of the current location of each individual mobile telephone in accordance with conventional principles by monitoring their respective device identities. In the case of a corporate mobile telephone having two device identities the two device identities are transmitted alternately when the mobile telephone is activated.

Each mobile telephone has a user interface, e.g. a conventional key-pad with keys for the digits 0, 1, . . . 9 and keys for special functions, among these a key calling up different menus. On one such menu the user of a corporate mobile telephone may select to use either a corporate subscription or a private subscription for outgoing calls. When the corporate subscription is selected only the first device identity is transmitted from the mobile telephone and the second device identity is not transmitted. When the first identity has been selected the mobile telephone is pre-programmed to make outgoing calls to one specific telephone number only, in particular the telephone number to the mobility server. In the following this number will be referred to as the "home" number of the corporate mobile telephone. In a preferred embodiment of the invention the "home" number is common to all of the mobile telephones MT1–Mtm. When the private subscription is selected only the second device identity is transmitted from the mobile telephone and the first device identity is not transmitted. When in this state the mobile telephone operates like an ordinary mobile telephone and outgoing calls can be made to any desired destination, subject to the provisions stipulated in the private subscription.

Outgoing calls from a corporate mobile telephone

Next an outgoing call from mobile telephone MT1 to a PABX external subscriber A shown in FIG. 1 will be described. The employee makes an outgoing call using the "home" number. The corresponding signals are transmitted over a radio channel from MT1 and are picked up by the nearest base station 5 where they are detected and transformed into electrical signals which eventually reaches an MSC from where they are transferred, as schematically shown by arrow 9, to an exchange in the PSTN. In said exchange digit analyses takes place and the call is routed through the PSTN to the exchange at which the PABX is connected. This routing is represented by arrow 10. From said exchange the call is transmitted to the PABX 1. This part of the call is represented by arrow 11. The PABX recognizes that the destination of the incoming call is the mobility server 3 and relays the call to the mobility server 3. This part of the call is indicated by arrow 12.

Next the mobility server asks for the destination of the call the employee wants to make. This question may for example be sent by voice prompting. As an example the user may hear "if you want to make a PABX internal call press the zero key and the star key, if you want to make a local call, press the 1 key and the star key, if you want to make a long distance call, press the 3 key and the star key". As an alternative no question is made but instead the employee is prompted to dial the destination number or the key sequence representing the requested service. The employee enters the digits, in this case the catalog number of subscriber A. Digit analyses is performed by the PABX.

As a result of the digit analyses mobility server establishes the requested service or the destination of the requested outgoing call. This is indicated in box 46 in the flow diagram of FIG. 6. Next the mobility server checks the service requested by MT1 against a service profile allotted to MT1. This is indicated in box 47. If the requested service matches the service profile, alternative "YES" at decision box 48, the mobility server sets up an outgoing call, box 49, by dialling the catalog number that MT1 signalled to the mobility server. If there is no match, alternative "NO" at decision box 48, the requested service is rejected, box 50.

Figure 8:
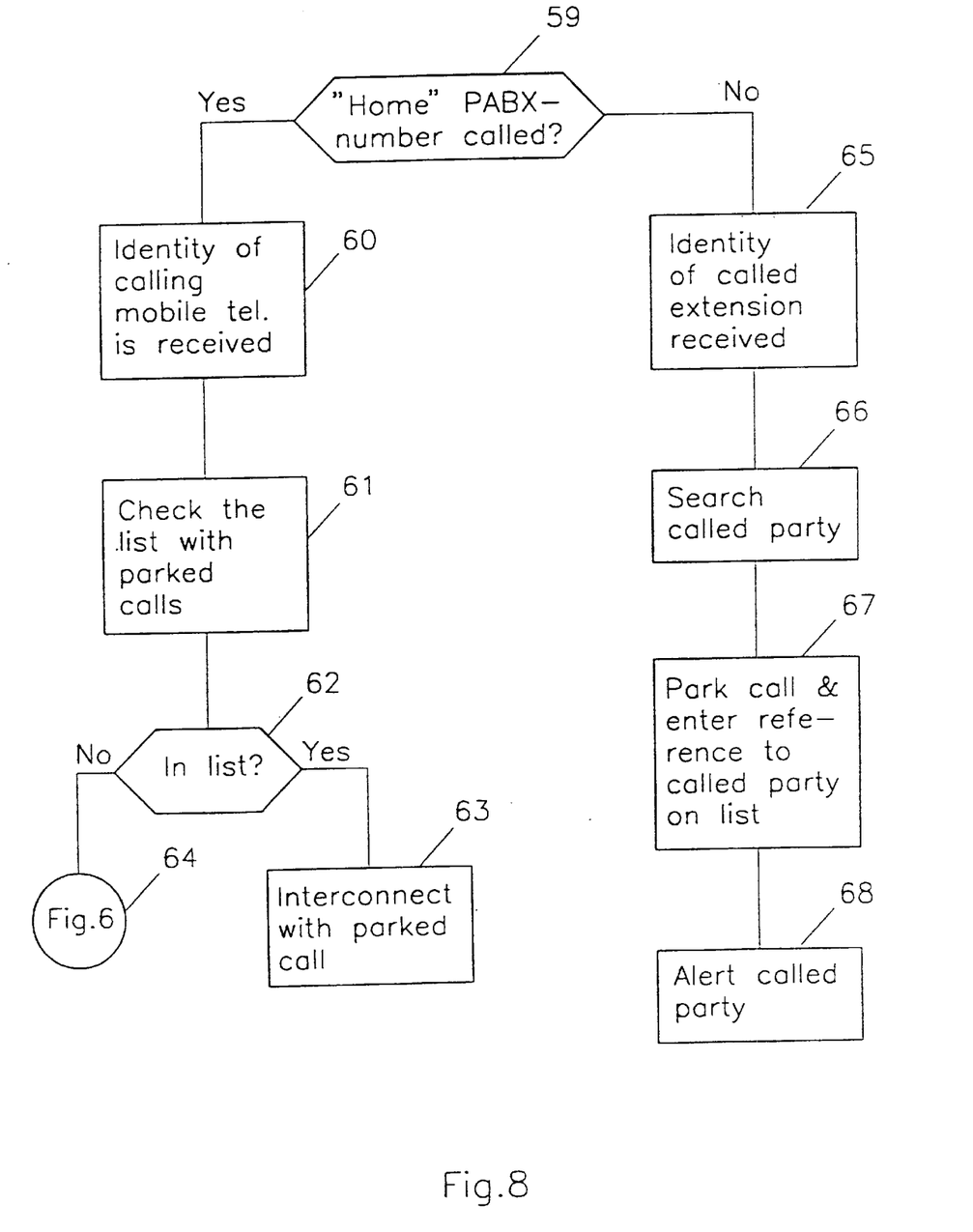
FIG. 8 is a flow diagram showing the call handling sequence for an incoming call to the mobility server.

The above procedures performed by the mobility server are preferably implemented by providing the mobility server with corresponding intelligence in the form of a computer program to be described in connection with FIG. 8.

In the example shown the outgoing call passes the PABX, as represented by arrow 13, and from there to the exchange at which the PABX is connected, as represented by arrow. 14. From said exchange the outgoing call is routed through the PSTN to an exchange at which subscriber A is connected. This is indicated by arrow 15. From said exchange the telephone call is carried by a subscriber line to the telephone set 7. This part of the call is indicated by arrow 16. When subscriber A lifts the handset the mobility server interconnects the two calls as indicated by double headed arrow 17 thus completing the call from MT1 to A. Accordingly there is one call from MT1 to the mobility server and a second from the mobility server to subscriber A. When the telephone conversation is finished and user of MT1 pushes the key for releasing the call and/or subscriber A goes on hook the two calls are released in conventional manner.

Should MT1 or the user of MT1 request a service which is not present in his service profile then the mobility server rejects the requested outgoing call.

Figure 2:
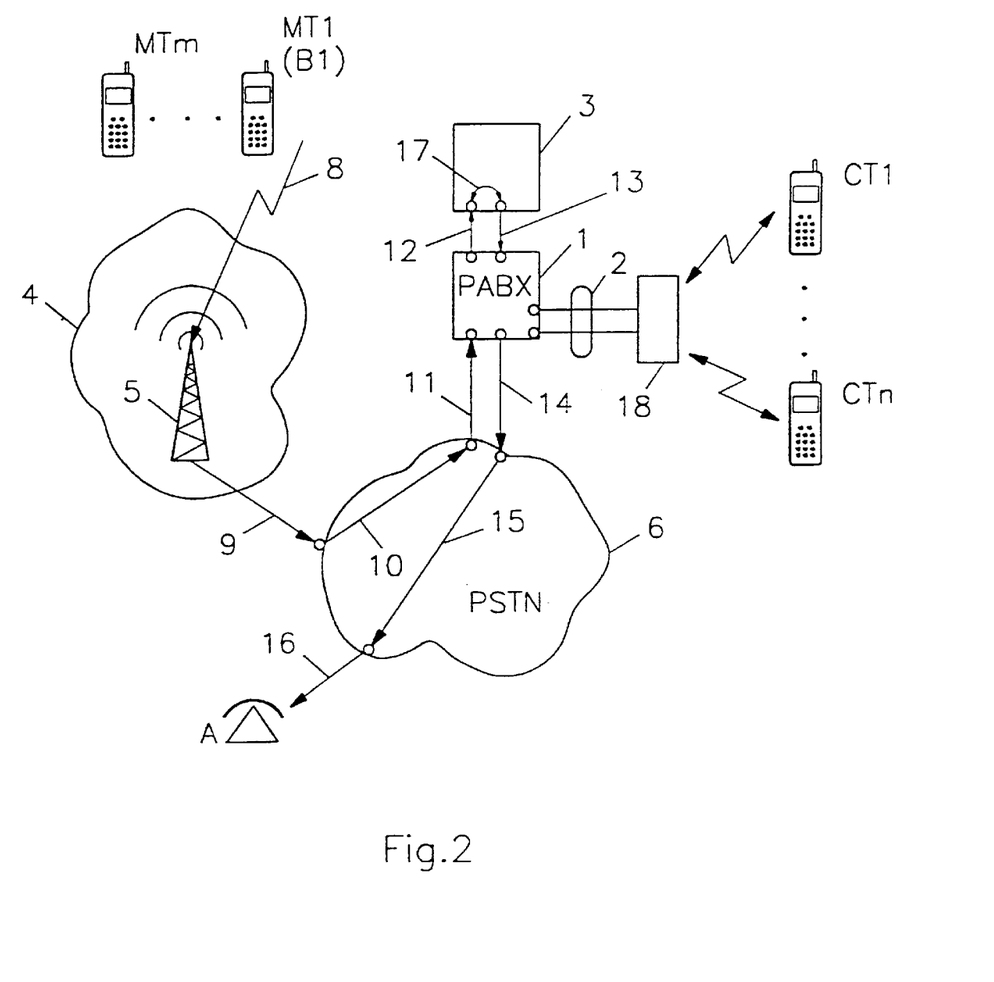
FIG. 2 illustrates the same as FIG. 1 although in a connection with a local network comprising cordless telephones.

In FIG. 2 a similar situation as that shown in FIG. 1 exists, although the office telephone sets B1 . . . Bn are replaced by a local network comprising a radio exchange 18 connected to the PABX 1. Cordless telephones CT1 . . . CTn are connected to the radio exchange 18 over radio channels. It should be understood that the operating range or area coverage of a cordless telephone is restricted to a local area. It might therefore be necessary to provide some of the users of the cordless telephones with mobile telephones in order to give wide area mobility to said users.

Figure 3:
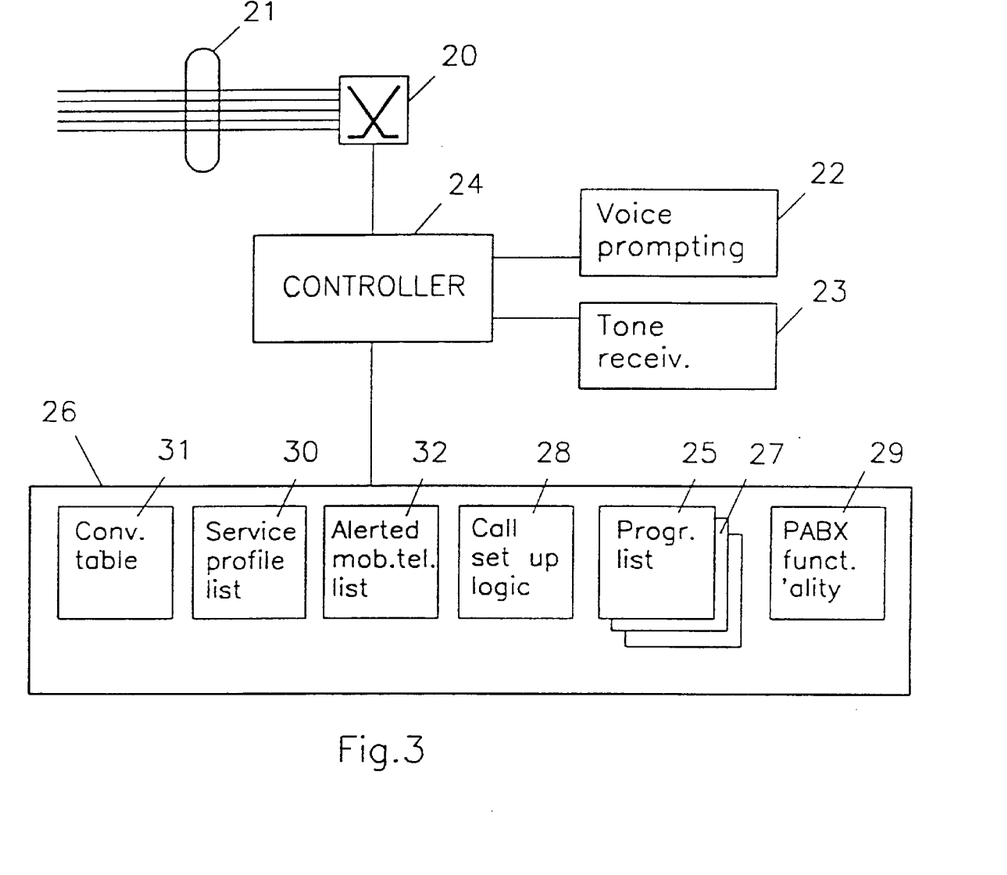
FIG. 3 illustrates the general layout of a mobility server in accordance with the invention.

In FIG. 3 a block diagram of the mobility server is shown. Generally it comprises a switch 20 with a sufficient number of input and output ports, generally shown at 21, to handle a number of concurrent calls. By means of wires, not shown, said input and output ports are connected to the PABX 1. If desired some of the input and output ports 21 may be connected directly to the local exchange at which the PABX is connected. Using a number of such direct connections to the local exchange the mobility server may place its outgoing calls at the local exchange instead of routing them through the PABX at was shown in FIGS. 1 and 2. A voice prompting device 22 and a tone receiver 23 is connected to a central controller 24 which operates under the control from a main software program 25 provided in a memory device 26. A number of software program modules are present in the memory device 26. There is alerting program module 27, a call setup program module 28 and a PABX functionality program module 29 comprising generally the same functions as those provided by the PABX 1. Program modules 25–29 are preferably stored in a read only memory ROM. The memory device 26 further comprises a memory area 30 for storing a service profile list containing the individual service profile associated with each of the corporate mobile telephone users. In a another memory area generally labelled 31 there is stored a conversion table to be described below and in still another memory area 32 there is stored a list of all corporate mobile telephones that have been alerted but that have not yet made a call back to the mobility server. Memory areas 30–32 are preferably located in a random access memory RAM.

The mobility server acts as an agent or intermediary for all calls, incoming calls as well as outgoing, to and from the corporate mobile telephones.

For this reason it is proposed to associate a corporate mobile telephone with two telephone number s and to exercise a special scheme for incoming calls to the corporate mobile telephones MT1–Mtm. A scheme of this type has been type has been proposed in our WO 93/16543 and WO 93/16546 and Swedish patent application Serial No. 9302162-4 which all are incorporated herein by reference. One of said two telephone numbers is a directory number which is public and leads to the mobility server 3. The other number is a mobile telephone number, which is held secret to the public and which is known only to the mobility server and which leads to the mobile telephone with which it is associated. This secret mobile telephone number would be used by the mobility server only in order to alert a called mobile telephone of the presence of a call. The alerted person then makes an outgoing call on her/his mobile telephone, said outgoing call being directed to the mobility server. As will be explained later, in connection with FIG. 9, a called person can be alerted by the mobility server by using other means than the corporate mobile telephone. Therefore there is even not necessary for a corporate mobile telephone to have a mobile telephone number associated with the first one of said two device identities associated with a mobile telephone.

In accordance with the present invention it is also suggested that the user of a corporate mobile telephone MT1–Mtm may select to buy a private mobile telephone subscription and associate it with the second one of said two device identities of a corporate mobile telephone.

Figure 4:
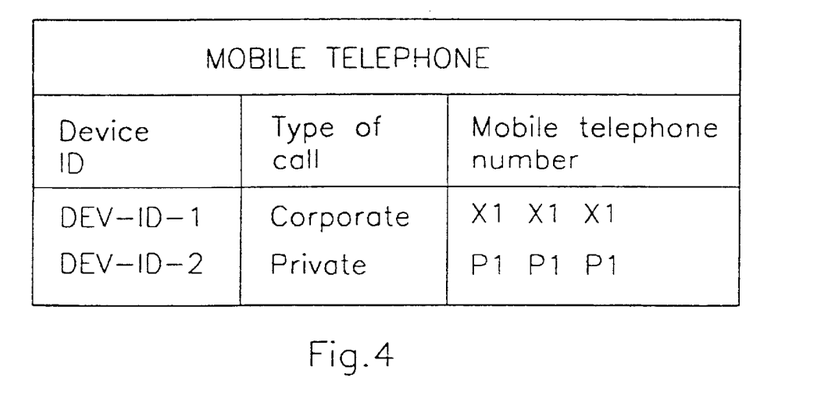
FIG. 4 illustrates a record of a corporate mobile telephone having two device identities.

In FIG. 4 there is shown a record comprising information which a mobile telephone network operator keeps for an individual corporate mobile telephone. As appears the mobile telephone is associated with two device identities DEV-ID-1 and DEV-ID-2. The mobile telephone number associated with DEV-ID-1 is indicated as X1X1X1 and this number, if used at all, is only used for alerting the user of an incoming call. The mobile telephone number associated with DEV-ID-2 is indicated as P1P1P1 and this number is only used for private calls, incoming as well as outgoing.

Before initiating an outgoing call from a corporate mobile telephone the user first selects whether to make a private call or a corporate call. For private outgoing calls the services available to the user are restricted to those which are associated with the private subscription and for corporate outgoing calls the services available to the user are those indicated in the corporate service profile associated with the individual user.

Figure 5:
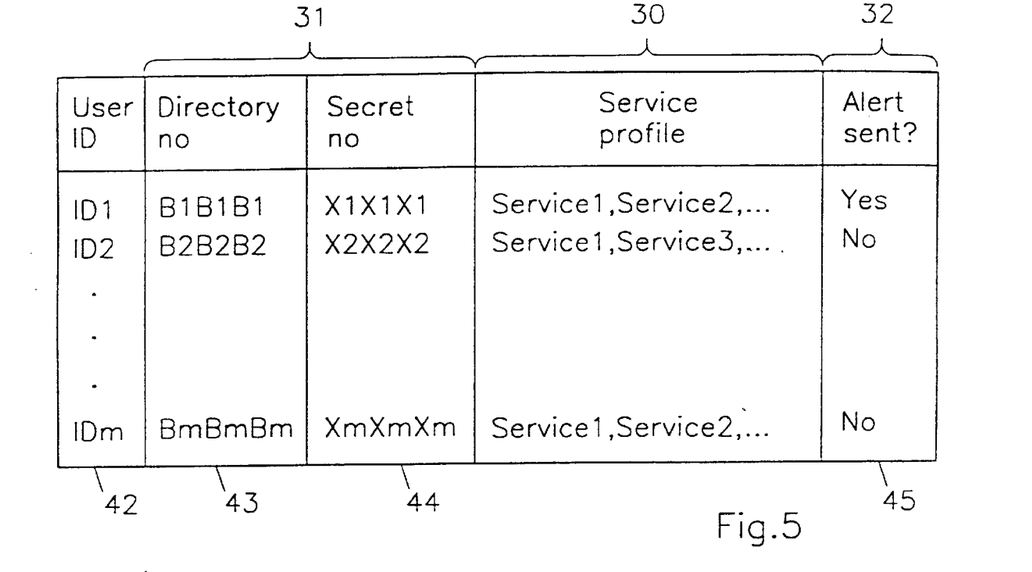
FIG. 5 illustrates an example of a layout of a memory area present in the mobility server in accordance with the invention.

In FIG. 5 the four memory areas 30–33 of FIG. 3 are shown in detail. For the sake of clarity it is supposed that each row in FIG. 5 is associated with a respective corporate mobile telephone. Moreover it is supposed that a user at office telephone set B1: (a) has a directory number B1B1B1 open to the public and used for accessing said user irrespective of which telephone she/he is using, be it a corporate mobile telephone, an office telephone set or a cordless telephone, and (b) is the user of a mobile telephone MT1 which has associated with its DEV-ID-1 said secret mobile telephone number X1X1X1. Likewise a user of an office telephone set B2 is supposed to have a directory number B2B2B2 and is supposed to dispose over corporate mobility telephone MT2 which has associated with its DEV-ID-1 the secret mobile number B2B2B2. Similar assumptions hold for the B3, B4 . . . Bm office telephone sets. In column 42 the identity of the users of the mobile telephones are listed, for example by name or employment number. In column 43 the directory numbers are indicated and in column 44 the secret mobile telephone numbers are indicated. Columns 43 and 44 together make up the conversion table 31. In the next column the service profile list 30 of each user is indicated. As an example SERVICE 1 represents a PABX internal call, SERVICE 2 represents a call to a predefined group of employees, SERVICE 3 represents local area calls, SERVICE 4 represents calls to the corporate mobile telephones M1–Mtm, SERVICE 5 represents long distance calls, SERVICE 6 represents international calls, SERVICE 7 represents conference call. Many examples of services are conceivable. The company decides the services allotted to its employees. The company may give each individual employee an individual service profile or may design predetermined service profiles to different groups of employees or may design one service profile common to all of its employees. In column 45 it is indicated whether an individual user has been alerted or not. Alerting will be described in connection with FIGS. 7 and 8.

The above description presupposes that the PABX is of a type that permits direct in dialling to its extensions. That is why the directory numbers are different. Should the PABX be of a type which do not allow for direct in dialling, then all directory numbers in column 43 would be equal.

Figure 6:
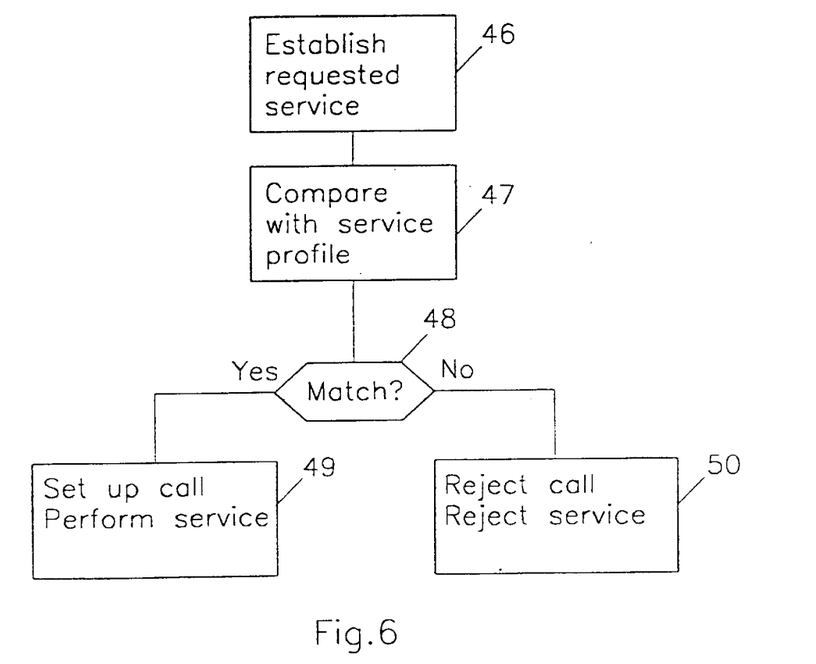
FIG. 6 is a flow diagram illustrating the operation of the mobility server during set-up of an external outgoing call from a corporate mobile telephone.

With reference to FIG. 6 it will now be described how the mobility server 3 controls the services requested in an outgoing call from a corporate mobile telephone. It will be assumed that the calling user has selected to use the corporate subscription, that the mobility server 3 has identified that the call is from the calling user's corporate mobile telephone and that the user of the corporate mobile telephone is dialling a key sequence. The key sequence represents a service request and may either represent a request for establishing a connection with a specified telephone number or may represent a request of activating or deactivating a service, such as call forwarding. Digit analyses takes place, box 46, to find out the requested service, box 48. Next the requested service is compared with the service profile associated with the calling user to see if there is a match, decision box 51. If there is a match, "YES" at decision box 51, the mobility server sets up the requested call if it was a call that was requested or initiates the requested service if it was a service that was requested, box 52. If there is no match the mobility server rejects the call or does not initiate the requested service, box 53. In general the PABX functionality program module 29 comprises all functions necessary for performing this service analysis.

If the calling user has selected to use the private subscription, then the corporate mobile telephone transmits its second device identity DEV-ID-2 only and temporary blocks the transmission of its first device identity DEV-ID-1. Now the corporate mobile telephone behaves like an ordinary mobile telephone and the mobility server has no control of the services requested in the private call.

Incoming calls to a corporate mobile telephone

Figure 7:
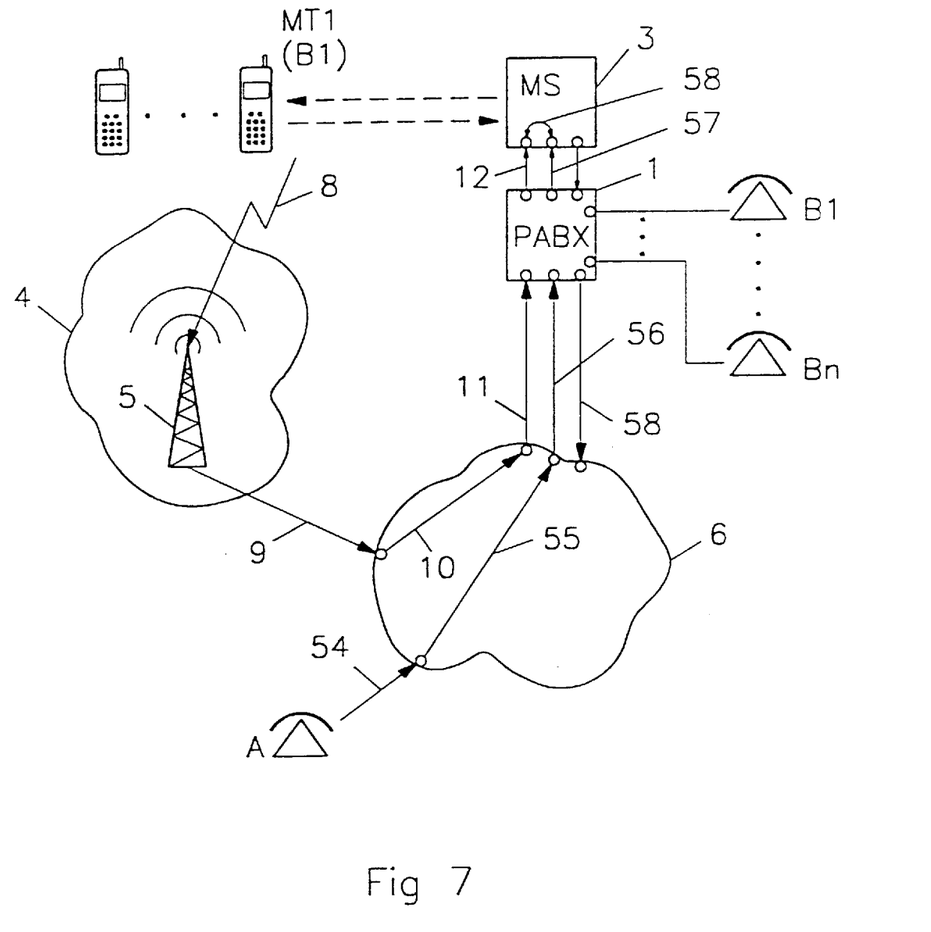
FIG. 7 illustrates the basic concept of the mobility server in accordance with the present invention when it operates to terminate a call from a user to a corporate mobile telephone.

In FIG. 7 there is illustrated the case when a PABX external subscriber A makes a call to an employee which has the directory number B1B1B1. Subscriber A does not know whether the called employee will take the call on her/his office telephone B1 or on her/his mobile telephone MT1 or on her/his cordless telephone CT1. The call from A, indicated by arrow 54 is routed through the public telephone network 6, arrow 55 to the exchange at which PABX is connected. From said exchange the call is directed to the PABX1, arrow 56. Generally speaking the PABX might have an indication of the current location of the called employee based upon information, stored in the memory of PABX, relating to the terminal type that the called employee did use in her/his last call administered by the PABX or based upon information communicated to the PABX by the called employee, for example in consequence of a call forwarding request from said employee. If no such information is available to the PABX the PABX might be programmed to search the called employee at first at her/his office telephone set, next at her/his cordless telephone and finally at her/his corporate mobile telephone. It is supposed that the called employee of B1 is not in the vicinity of her/his office telephone nor is she/he answering at her/his cordless telephone. Accordingly there is no reply at telephone set B1 nor at CT1. The PABX now routes the incoming call 56 to the mobility server 3 as exemplified by arrow 57. Alternatively the called employee is searched in parallel at the different possible terminals.

The mobility server parks an incoming call 57 and identifies the call as being directed to B1B1B1. Next the mobility server must notify the called employee, in this case the user of MT1, that a call is waiting for her/him. Such notification, also referred to as an alert, may be performed in may different ways as described in our WO93/16564 which is incorporated herein by reference. As an first example of the way MT1 is alerted the mobility server 3 makes an outgoing call giving as destination the secret mobile telephone number X1X1X1. This notification or alert in the form of an outgoing call is represented by arrow 58. This call is routed though PSTN 6 and will eventually be terminated at a base station 5 from where MT1 will be given a call over a radio channel. In a very basic and rude implementation of the invention there is an agreement between the users of the corporate mobile telephones MT1–MTm and the mobility server 3 that an incoming call to a corporate mobile telephone shall not be answered. When a number of ring signals have been given, said number being agreed upon previously, the mobility server 3 hangs up thus releasing the connection to the base station 5. When the called employee hears her/his telephone ringing said number of signals she/he knows there is a call waiting for her/him. Next she/he selects to use the corporate subscription and makes an outgoing call to the mobility server using the "home" PABX number. When asked for the destination of the call the called employee indicates, by dialling a predefined key sequence at her/his mobile telephone keypad, that the call is made in consequence of a previous alert from the mobility server, the PABX interconnects the call from the called employee with the parked call from subscriber A, thus completing a call between the two parties. The conversation can now start. The sequence of operations described above can of course be executed automatically by the mobile telephone when the called party accepts the call.

If there is an incoming call which as destination uses the private mobile telephone number P1P1P1 this call will be treated, by the mobile telephone network, as an ordinary mobile telephone call. When this call eventually reaches the called employee her/his mobile telephone will stop transmitting its corporate device identification DEV-ID-1 thus blocking the mobile telephone for receiving alert signals issued by the mobility server.

From the above it is apparent that the PABX may terminate two different type of calls: calls in consequence of a previous alert and calls not in consequence of a previous alert. Calls of the first type originate from alerted corporate mobile telephones and are using the "home" PABX number. Such calls are possible to identify because they are directed to the "home" PABX number. Calls of the second type originate from external telephones, like subscriber A's telephone, from internal telephones B1–BN or from external non-corporate mobile telephones. The two types of calls should be handled in different ways. How this is done will be explained in connection with the flow diagram of FIG. 8.

Incoming calls to the PABX

It is supposed that a corporate mobile telephone is alerted using the above rude alert process which makes use of the mobile telephone network and which involves no pick-up of the call.

When there is an incoming call at any of the input ports of the PABX the PABX first decides whether the call is using the "home" PABX number or not, decision box 59. If the "home" number is used, then the call is from any of the corporate mobile telephones, alternative "YES". Next the calling corporate mobile telephone identifies itself, box 60. Next the PABX checks a list comprising parked calls to see if the calling corporate mobile telephone is associated with an employee that has been searched, box 61. If so, alternative "YES" at decision box 62, the PABX interconnects the calling corporate mobile telephone with the parked call, box 63, and the parties can now begin their conversation. If the identified corporate mobile telephone is not on the list with parked calls, alternative "NO" at decision box 62, then the user of the corporate mobile telephone wants to make an outgoing call which should be subjected to the operations described in FIG. 6, as indicated by circle 64.

If the incoming call does not use the "home" number of the PABX, then the call is of the second type, alternative "NO" at decision box 59 and the mobility server establishes the identity of the called extension, box 65, as described in connection with FIG. 7, and searches the called employee, box 66, by using any of the search schemes described in connection therewith. If there is no answer the incoming call is parked and is assigned a reference, for example the identity of the called corporate mobile telephone. The reference to the parked call is entered in a list comprising current parked calls. This is indicated in box 67. Finally the called employee's mobile telephone is alerted, box 68. If there is an answer in box 66 the incoming call is interconnected with the extension and the call is completed.

All of the parked calls are subjected to a time out test. If a parked call has waited longer than a predefined time, a voice mail facility may ask the waiting caller if she/he wants to leave a message or if she/he wants to wait for another period of time.

Figure 9:
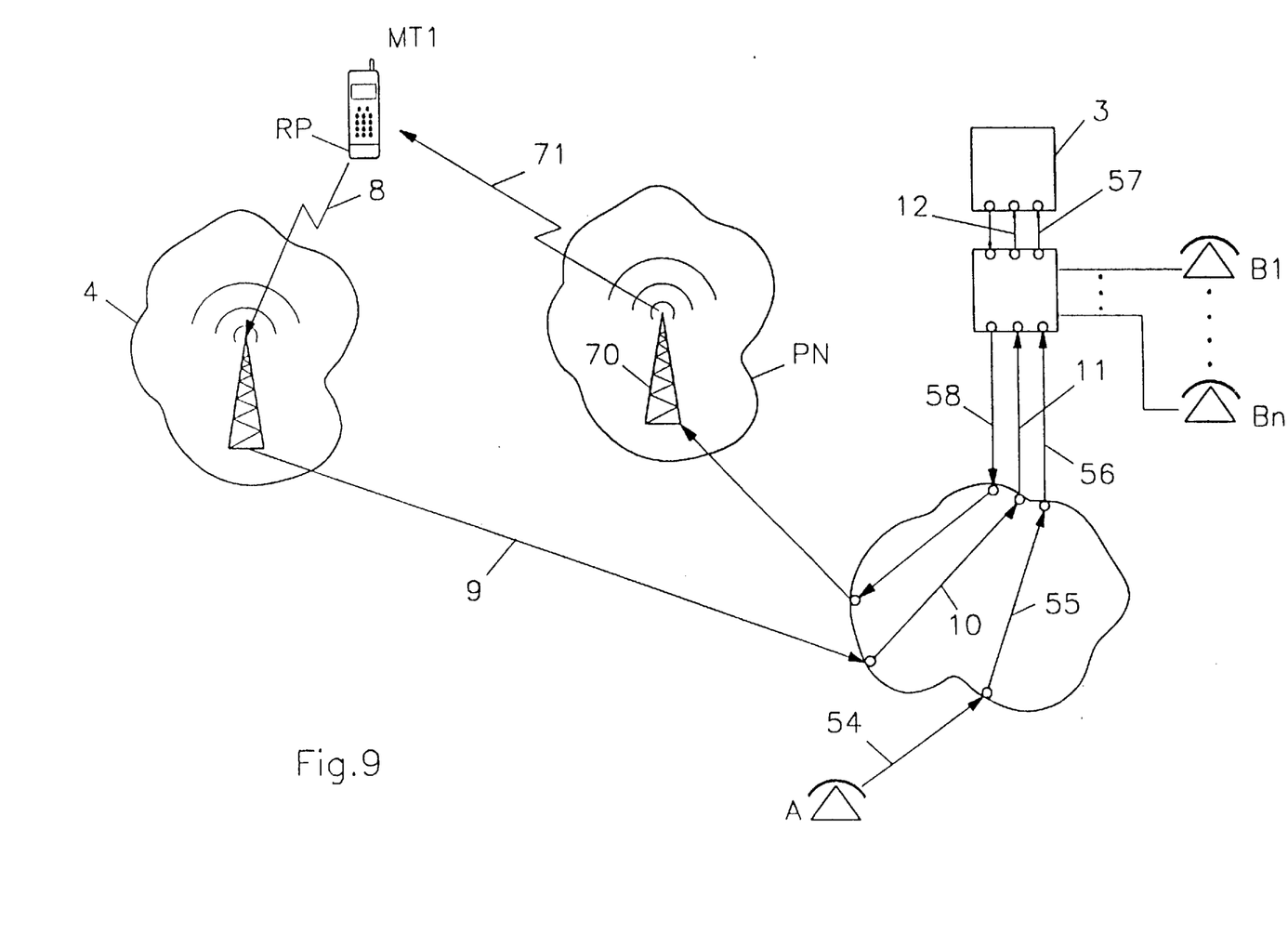
FIG. 9 illustrates a second embodiment of the mobility server in accordance with the invention for use with corporate mobile telephones provided with integrated radio pagers.

In FIG. 9 a modification of the alert step (box 68) is illustrated. Instead of alerting the called corporate mobile telephone via the mobile telephone network 4 paging is made using a paging network PN, preferably a wide area paging network. In order for the paging to work it is necessary to provide each user of the corporation mobile telephones with a radio pager RP. Instead of dialing the secret mobile telephone number the mobility server dials the telephone number to the radio pager RP carried by the called user of the corporate mobile telephone. This is indicated at arrow 58. The call is routed through the PSTN and from there to a paging central 70 in the paging network 67. The paging central broadcasts a paging signal, represented by arrow 71, containing the device identity of the radio pager. This signal is received by all radio pagers, but only the radio pager that has a device identity corresponding to the broadcasted one will trigger. When triggered it will buzz thus alerting the user that she/he should make an outgoing call to the mobility server 3. In a preferred embodiment of the invention the radio pager 68 is integrated with mobile telephone in a manner as described in our EP-A- 92 850 086.7. When the integrated radio pager receives a paging signal corresponding to its device identity it will wake up the sleeping mobile telephone and the mobile telephone will automatically dial the telephone number to the mobility server. The outgoing call is indicated by arrows 8–11. When the call is answered by the mobility server the calling employee or the calling mobile telephone identifies herself/himself/itself, box 60 in FIG. 8.

In a modified embodiment of the alert process described in the above paragraph the paging signal, further to containing the device identity of the radio pager, also contains an interaction number of the kind described in our WO93/16547. Said interaction number is assigned to said parked call and is entered into said list of current parked calls. When the corporate mobile telephone is requested to identify itself in box 60 it sends the interaction number it received during the paging process. In box 61 the mobility server compares the interaction number received in box 60 with the interaction numbers of the list of parked calls and when there is a match the parked call, to which the interaction number has been assigned, is interconnected with the call from the corporate mobile telephone that identifies itself by the same interaction number.

Figure 10:
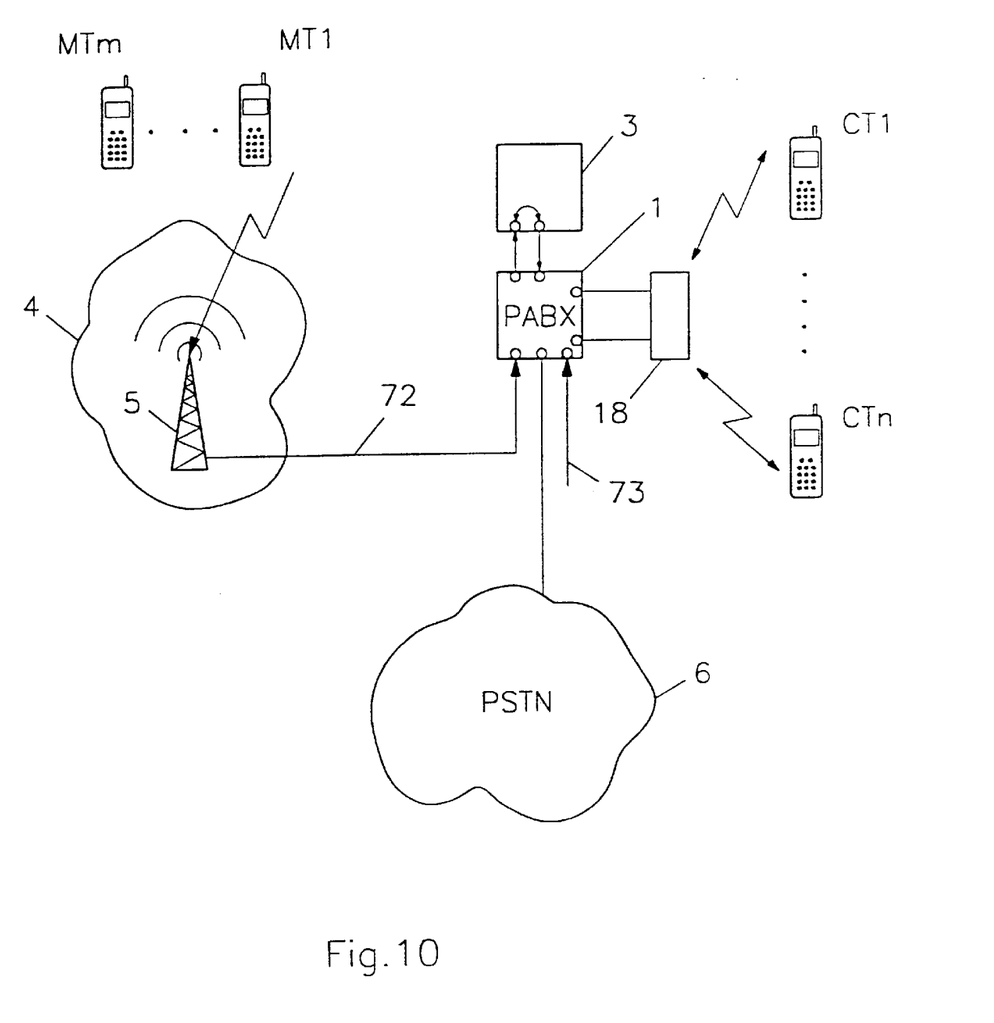
FIG. 10 is similar to FIG. 2 and illustrates a further embodiment of a corporate communications system in accordance with the invention.

In FIG. 10 it is assumed that the base station 5 has a coverage area that includes the premises of the company. For that reason it is likely that many mobile telephone calls from the company's corporate mobile telephones will be picked up by the base station 5. Instead of having such calls routed through the mobile telephone network 4 and the PSTN 6 there is a direct line 72 provided between the base station 5 and the PABX 1. When the base station identifies the presence of a corporate mobile telephone, the base station routes the outgoing call from this corporate mobile telephone to the direct line 72 instead of routing it further into the mobile telephone network 4. In this manner more resources of the mobile telephone network 4 and of the PSTN 6 will be available for non-company traffic. Such identification is realized by arranging so, that all of the corporate mobile telephones MT1–MTm can make outgoing calls to one and the same telephone number only, said telephone number being a number which leads to the PABX 1. When the base station detects a call which as its destination has said telephone number it routes the call to the direct line 72.

In FIG. 10 there is provided a direct line 73 from PABX 1 to a corresponding PABX which belongs to a subsidiary of the company. Said subsidiary is resident in another town, where there are employees which also have corporate mobile telephones. Said subsidiary has a company network similar to that shown in FIG. 10. The corporate mobile telephones of the subsidiary can make outgoing calls to one and the same telephone number only, namely a telephone number leading to the PABX of the subsidiary, the so called subsidiary "home" number. Said subsidiary "home" number is different from that used by the corporate mobile telephones MT1–MTm of FIG. 10. By providing the base station 5 in FIG. 10, which is situated in the vicinity of the main office of the company, with the subsidiary "home" number and instruct the base station 5 to route calls which as destination use the subsidiary "home" number to the direct line 72 it will be possible for visiting users having corporate mobile telephones of the subsidiary to use the PABX 1 shown in FIG. 10. When the PABX 1 receives a call from a visiting mobile telephone the PABX 1 forwards the call, via the direct line 73, to its "home" PABX resident at the subsidiary where it is subject to service analyses. The base station 5 will in this case be programmed with two "home" numbers, one to the central office PABX and the other to the subsidiary PABX. As an alternative the "home" numbers of the central office and the subsidiary office are one and the same 020-number (in the U.S.A. one and the same 800-number). In this manner the geographical position of a corporate mobile telephone, be it a central office mobile telephone or a subsidiary mobile telephone, will determine the company PABX at which the call will be picked up. As is well known the 020-number service (the 800-number service in the U.S.A.) will direct a call that uses this number to the service switch point (SSP) which geographically is situated nearest to the telephone/terminal that originates said call. When receiving a call that as destination uses said 020-number the SSP will forward the call to the nearest company PABX.

Figure 11:
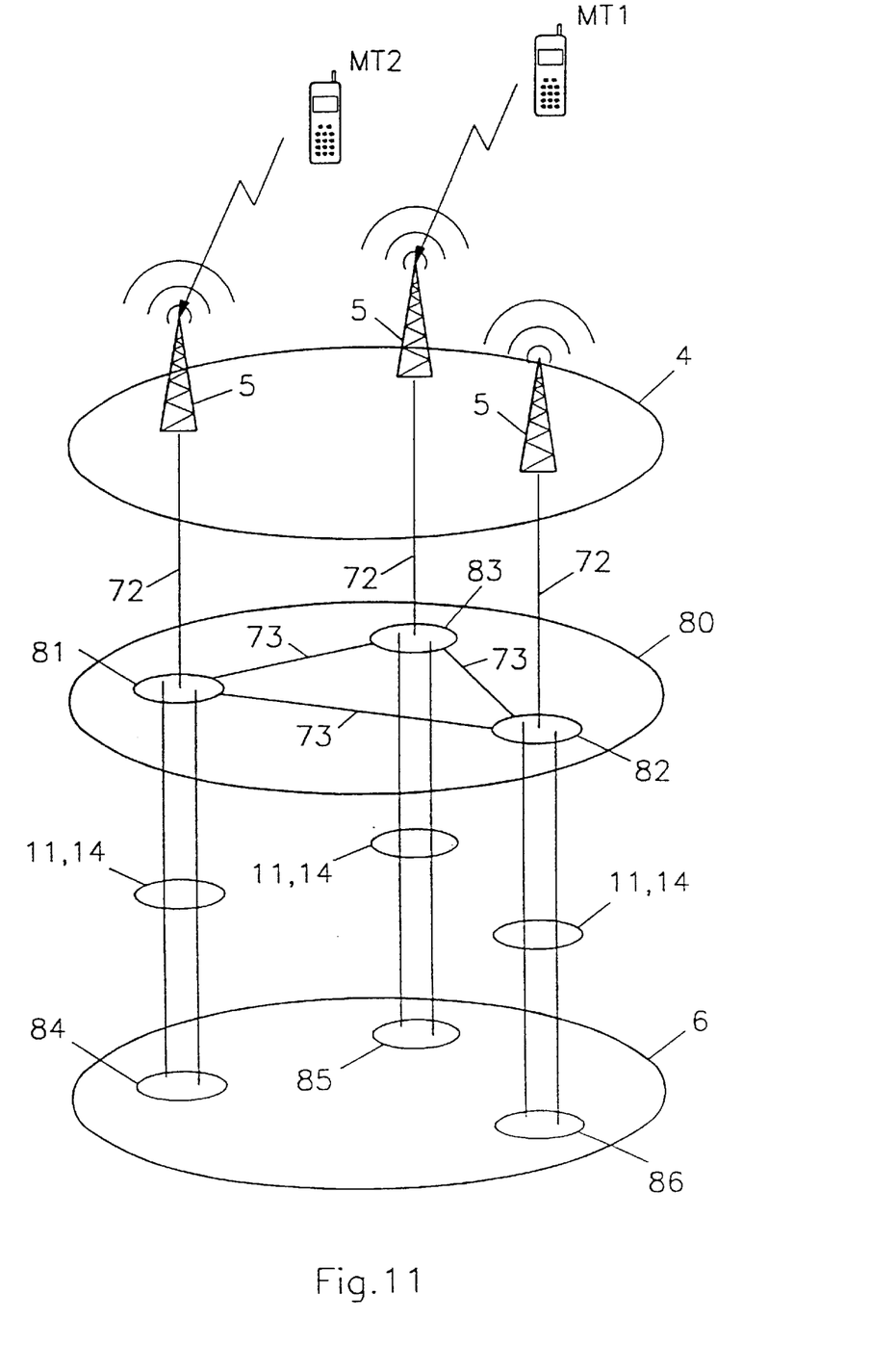
FIG. 11 is showing different networks and how they are interrelated and FIG. 12 is a block diagram showing alternative ways of providing direct lines between a company PBX and a mobile telephone network.

The above principle can be repeated for as many subsidiaries, factories and premises a company has subject to the provision that each such subsidiary, factory and premises has its own PABX. In this manner corporate mobile telephones MT1, MT2 . . . shown in FIG. 11 will use the mobile telephone network 4 for access to a company network 80 comprising individual islands 81, 82, 83 of the kind shown in FIG. 10. Each such island is a company local network comprising a mobility server 3, a PABX 1 and associated telephone equipment as shown in FIG. 1, FIG. 2, FIG. 7, FIG. 9 and FIG. 10. The islands 81, 82, 83 (i) are connected to respective base stations 5 by direct lines 72, (ii) are mutually interconnected by leased lines 73 to form a company network 80, and (iii) are connected to the PSTN 6 by subscriber lines 11, 14. The subscriber lines 11, 14 may be leased lines.

As indicated above direct lines may be provided from the company PABX to a base station BS, to a base station controller BSC and to a mobile switch center MSC as a complement to or instead of the direct lines 72. Such direct lines are labelled 90, 91 and 92 in the block diagram of FIG. 12.

Figure 12:
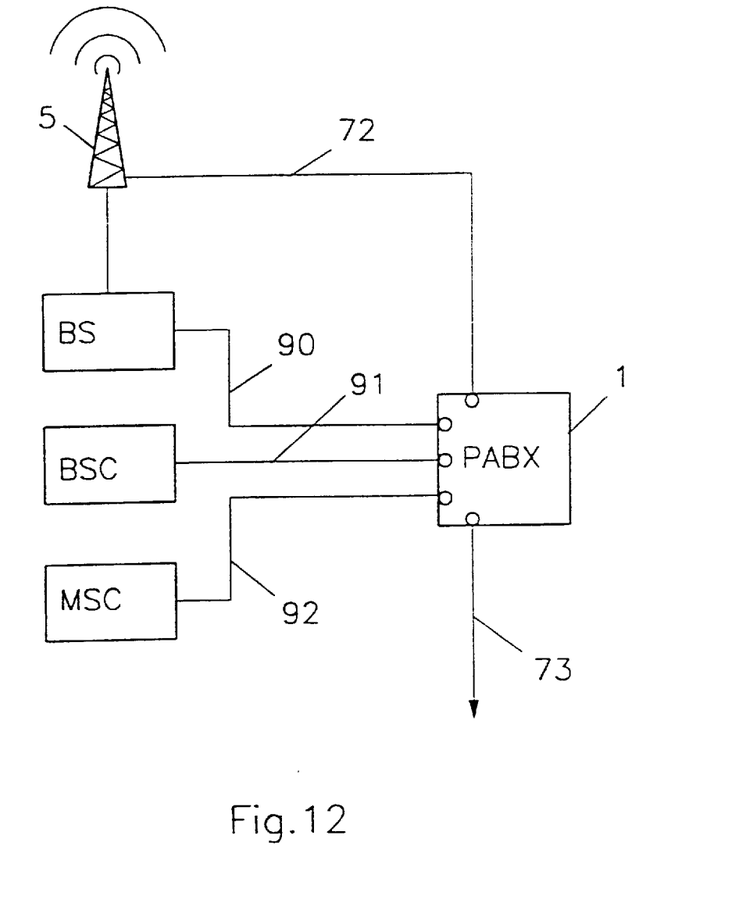

From the above it is clear that the mobility server additional functions referred to in the introductory portion of the specification i.a. include: receiving and managing of incoming calls from corporate mobile telephones including checking of the service profiles of each such incoming call and initiating or rejecting outgoing calls from corporate mobile telephones; receiving and managing incoming calls which as destination have a corporate mobile telephone including parking of such calls, alerting the called mobile telephones, recording the parked calls and upon termination of incoming calls from alerted corporate mobile telephones interconnecting such calls with their respective parked calls. Modifications and variations of the above listed functions are conceivable and do comply with the particular design of the corporate communications system. In FIG. 12 a PABX provided with said additional functions is shown.

I claim:

1. A corporate/organization communications system comprising mobile telephones which are associated with a company/organization and which are operating in a mobile telephone network, a local network comprising access units connected to extensions of a private automatic branch exchange PABX which is connected to the public switched telephone network (PSTN) wherein said company/organization allots an individual service profile to each one of said mobile telephones, said mobile telephones being adapted to make outgoing calls to a service node only, said service node being adapted to control services requested by any of said mobile telephones in an outgoing call by comparing said requested services with the service profile allotted to the mobile telephone from which the outgoing call is made, said individual service node being connected to said local network, thus allowing said company/organization to exercise control over the services requested from any one of said mobile telephones although said company/organization has no control over the mobile telephone network.

2. A corporate/organization communications system in accordance with claim 1, said company/organization, referred to as the central company/organization, having a subsidiary, said subsidiary having:

subsidiary associated mobile telephones operating in said mobile telephone network and a subsidiary local network comprising access units connected to extensions of a subsidiary PABX which is connected to the PSTN wherein said company/organization allots an individual service profile to each one of said subsidiary mobile telephones, said subsidiary mobile telephones being adapted to make outgoing calls to a subsidiary service node only, an outgoing call from a subsidiary mobile telephone which is visiting the central company/organization being forwarded to the subsidiary service node where it is subjected to service control.

3. A corporate/organization communications system in accordance with claim 2, wherein a base station in the mobile telephone network which serves said central company/organization is programmed with a home number which are used by said subsidiary mobile telephones when making an outgoing call, said base station forwarding calls, which are using said home number, to the service node of said central company/organization, said service node redirecting said forwarded outgoing call to the subsidiary service node where it is subjected to said service control.

4. A corporate/organization communications system in accordance with claim 3, wherein a first direct line extends between the PABX of said central company/organization and the subsidiary PABX, and a second direct line extends between said base station and said central company/organization PABX.

5. A corporate/organization communications system in accordance with claim 4, wherein several local networks, each one associated with a respective subsidiary, are interconnected via several first direct lines into a company network, and wherein services requested by company/organization associated mobile telephones are controlled by the service node at the respective subsidiary.

6. A corporate/organization communications system in accordance with claim 1, wherein said access units are corporate cordless telephones.

7. A corporate/organization communications system in accordance with claim 1, wherein said access units are desk top telephones.

8. A corporate/organization communications system in accordance with claim 1, wherein each mobile telephone is associated with two subscriptions, one being corporate/organization related and one being private, each mobile telephone, when making a call to said service node, being adapted to use either the corporate/organization related subscription, in which case said service node controls any services requested in a call from any one of said mobile telephones by comparing the requested services with a predetermined service profile allotted to the calling mobile telephone, or the private subscription, in which case said service node does not perform said control.

9. A corporate/organization communications system in accordance with claim 1 wherein said PABX is provided with a functionality operating such that when there is an incoming call directed to a user of any of said mobile telephones and said user does not answer the call, the call is directed to said service node.

10. A corporate/organization communications system in accordance with claim 9, wherein said service node comprises information relating to the individual services an individual one of said mobile telephones has access to, said individual services being predetermined for each one of said mobile telephones and forming a service profile associated with the respective mobile telephone, said service node comparing the service requested in an outgoing call from an individual mobile telephone with the service profile associated with said individual mobile telephone in order to see if there is a match, said service node, upon a match, setting up said outgoing call, said service node, when there is no match, rejecting said outgoing call.

11. A corporate/organization communications system in accordance with claim 10, wherein each mobile telephone is associated with two mobile telephone numbers, one being the directory number and one being secret, that said directory number leads to said service node, said secret number being known only to the service node and leading to the mobile telephone associated with said secret number.

12. A corporate/organization communications system in accordance with claim 11, wherein an incoming call to said service node which uses the directory number being parked in said service node and being provided with an identification, said service node paging the called mobile telephone using its secret number, said paged mobile telephone, in response to said paging, making an outgoing call to said service node, said service node identifying the paged mobile telephone, and said service node finally connecting the parked incoming call with the call from said paged mobile telephone using the identity of said paged mobile telephone and the identity of said parked call.

13. A corporate/organization communications system in accordance with claim 12, wherein said service node, upon receipt of an outgoing call from a mobile telephone, establishing the identity of calling mobile telephone, checking all of the calls it has parked in order to determine if the call from the mobile telephone is (a) in response to an alert sent from the service node in which case the service node connects the call from the identified mobile telephone with parked call having associated therewith the corresponding identity or is (b) not in response to an alert sent from the service node in which case said control step is performed.

14. A service node for controlling service requested by a number of corporate/organization subscription mobile telephones, said service node comprising a conventional private automatic branch exchange the program software of which is modified to comprise additional functions required to provide a corporate/organization communications system in accordance with claim 1.

15. A corporate/organization communications system in accordance with claim 1, wherein all of the mobile telephones are adapted to make outgoing calls to a common telephone number only.

16. A method of charging mobile telephone calls from mobile telephones served by a service node in accordance with claim 15, wherein calls from said company/organization mobile telephones are charged collectively by the operator of the mobile telephone network and wherein said charging is based upon the total number of outgoing calls which as destination use said common telephone number.

17. A service node for controlling services requested by any mobile telephone associated with a corporate/organization, comprising switch means with ports for connection to a private automatic branch exchange (PABX), memory storage means comprising service profile list means for each one of said mobile telephones and controller means for controlling the services requested in a call from an individual one of said mobile telephones with the service profile associated with said individual mobile telephone to ascertain if there is a match, said controller means initiating an outgoing call, the destination of which is signalled to said service node from said individual mobile telephone, if the requested services matches the service profile associated with said individual mobile telephone.

* * * * *